United States Patent
Lee et al.

(10) Patent No.: US 7,881,002 B2
(45) Date of Patent: Feb. 1, 2011

(54) METHOD OF INCREASING RECORDING DENSITY OF HARD DISC DRIVE AND CONTROLLING DEVICE THEREOF

(75) Inventors: Hoo-san Lee, Osan-si (KR); Hyun-jei Kim, Seoul (KR); Sung-hoon Choa, Seoul (KR); Hoon-sang Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 11/946,074

(22) Filed: Nov. 28, 2007

(65) Prior Publication Data

US 2009/0009903 A1  Jan. 8, 2009

(30) Foreign Application Priority Data

Jul. 5, 2007  (KR) .................. 10-2007-0067746

(51) Int. Cl.
*G11B 5/02* (2006.01)
(52) U.S. Cl. ....................................... 360/68
(58) Field of Classification Search .......... 360/46, 360/75, 68, 66, 69, 67, 25, 31; 714/755; 712/37; 365/185.13, 189.06, 230.06
See application file for complete search history.

(56) References Cited

U.S. PATENT DOCUMENTS

| | | | | | |
|---|---|---|---|---|---|
| 4,347,586 | A | * | 8/1982 | Natsui | 365/104 |
| 4,488,274 | A | * | 12/1984 | Plunkett, Jr. | 369/24.01 |
| 4,545,038 | A | * | 10/1985 | Bellay et al. | 365/230.06 |
| 4,718,037 | A | * | 1/1988 | Thaden | 712/37 |
| 5,172,280 | A | * | 12/1992 | Quintus et al. | 360/31 |
| 5,257,146 | A | * | 10/1993 | Price et al. | 360/67 |
| 5,559,763 | A | * | 9/1996 | Ishii | 369/13.22 |
| 5,668,477 | A | * | 9/1997 | Mahmoudian et al. | 324/613 |
| 5,719,719 | A | * | 2/1998 | Tsuyoshi et al. | 360/66 |
| 5,734,612 | A | * | 3/1998 | Yoshikawa | 365/185.13 |
| 5,764,166 | A | * | 6/1998 | Yoshimura et al. | 341/58 |
| 6,489,779 | B1 | * | 12/2002 | Tucker | 324/522 |
| 6,493,161 | B1 | * | 12/2002 | Elliott et al. | 360/46 |
| 6,532,122 | B1 | * | 3/2003 | Sugawara et al. | 360/46 |
| 6,859,340 | B2 | * | 2/2005 | Brittner et al. | 360/75 |
| 7,119,990 | B2 | * | 10/2006 | Bajorek et al. | 360/128 |
| 7,237,173 | B2 | * | 6/2007 | Morita et al. | 714/755 |

(Continued)

FOREIGN PATENT DOCUMENTS

JP  9-102103 A  4/1997

(Continued)

*Primary Examiner*—Fred Tzeng
(74) *Attorney, Agent, or Firm*—Sughrue Mion, PLLC (57) ABSTRACT

Provided is a method of increasing recording density and a control apparatus for increasing the recording density. The method includes applying a recording current corresponding to a recording signal to a magnetic head of a hard disc drive (HDD), and limiting a current value being applied to the magnetic head to a critical value when the recording current reaches the critical value. In the method, a rising time is reduced by using an overshoot recording current and the recording current is limited to a critical value when an actual recording current reaches the critical value. Thus, write track widths (WTWs) can be reduced at a low recording frequency, thereby increasing tracks per inch (TPI).

11 Claims, 7 Drawing Sheets

U.S. PATENT DOCUMENTS

| | | | |
|---|---|---|---|
| 7,457,164 B2 * | 11/2008 | Ohta | 365/185.22 |
| 7,570,524 B2 * | 8/2009 | Bedeschi et al. | 365/189.06 |
| 2003/0043487 A1 * | 3/2003 | Morita et al. | 360/25 |
| 2008/0019031 A1 * | 1/2008 | Chu et al. | 360/69 |
| 2008/0298186 A1 * | 12/2008 | Escobar-Bowser et al. | 369/47.5 |

FOREIGN PATENT DOCUMENTS

| | | |
|---|---|---|
| KR | 10-2003-0031454 A | 4/2003 |
| KR | 10-0712550 B1 | 4/2007 |

* cited by examiner

METHOD OF INCREASING RECORDING DENSITY OF HARD DISC DRIVE AND CONTROLLING DEVICE THEREOF

CROSS-REFERENCE TO RELATED PATENT APPLICATION

This application claims the benefit of Korean Patent Application No. 10-2007-0067746, filed on Jul. 5, 2007, in the Korean Intellectual Property Office, the disclosure of which is incorporated herein in its entirety by reference.

BACKGROUND OF THE INVENTION

1. Field of the Invention

The present invention relates to a method of increasing recording density of a hard disc drive, and more particularly, to a method of increasing recording density in terms of tracks per inch (TPI) by using software.

2. Description of the Related Art

Hard disc drives are apparatuses for recording information, and more particularly, recording information onto concentric tracks of at least one side of a hard disc. A disc is rotatably mounted on a spindle motor, and information is accessed by using a magnetic head mounted on an actuator arm which is rotated by a voice coil motor. The voice coil motor is excited by a current so as to rotate the actuator, and thus, the magnetic head is moved.

A magnetic head includes a recording head and a reading head. If a recording current is applied to the recording head, the recording head stores information by magnetizing a region of the surface of a disc adjacent to the recording head. The reading head reads information recorded on the surface of the disc by detecting the change of magnetic property from the surface of the disc.

It is generally known that a perpendicular magnetic recording mechanism has a higher recording density than that of a horizontal magnetic recording mechanism. Thus, recently, most hard disc drives employ the perpendicular magnetic recording mechanism for increasing recording density.

In the perpendicular magnetic recording mechanism, a magnetization direction is arranged in a perpendicular direction to a plane of a medium. The perpendicular magnetic recording mechanism employs a perpendicular magnetic recording medium and a pole head. The perpendicular magnetic recording medium includes a double magnetic layer film of a ferro-magnetic layer and a soft magnetic under-layer (SUL). In order to record an information bit on the perpendicular magnetic recording medium using the pole head, an appropriate alternating current is applied to the pole head.

Many efforts to increase the TPI have been performed in hard disc drive (HDD) related industries. In this regard, studies to reduce a width of a write pole have been conducted. Also, in order to reduce a width of an erase band, a side shield is employed or hardware, such as a wraparound shielded (WAS) head that entirely surrounds the write pole, is employed.

SUMMARY OF THE INVENTION

To address the above and/or other problems, the present invention provides a method of increasing recording density of a hard disc drive (HDD) having a magnetic head and a hard disc by using software.

The present invention also provides a control apparatus for realizing the method of increasing recording density.

The present invention also provides a preamplifier having a function to realize the method of increasing recording density.

According to an aspect of the present invention, there is provided a method of increasing a recording density of a hard disc drive (HDD), the method comprising: applying a recording current corresponding to a recording signal to a magnetic head of the HDD; and limiting a value of a current being applied to the magnetic head to a critical value when the recording current reaches the critical value.

The critical value may correspond to a maximum recording current that is actually applied to the magnetic head when recording information at a high frequency.

The limiting of the value of the current may be performed by a clamping circuit disposed between the magnetic head and a preamplifier.

According to an aspect of the present invention, there is provided a method of increasing recording density of a hard disc drive (HDD), the method comprising: applying a recording current corresponding to a recording signal to a magnetic head of the HDD; determining a magnitude of a recording frequency; setting a critical value by referring to a look-up table comprising critical values according to the recording frequencies; and limiting a value of a current being applied to the magnetic head to the critical value when the recording current reaches the critical value.

The critical values in the look-up table may be individually determined according to characteristics of the magnetic head and the recording medium of individual HDD.

A magnitude of the critical value may increase according to an increase in the magnitude of the recording frequency.

The determining of the magnitude of the recording frequency may comprise determining the number of consecutive data "0".

In the determining of the magnitude of the recording frequency, if the recording frequency is a high recording frequency, the setting of the critical value, and the limiting of the value of the current may be omitted.

According to another aspect of the present invention, there is provided a control apparatus of a hard disc drive (HDD) comprising: a preamplifier that applies a recording current corresponding to a recording signal to a coil of a magnetic head of the HDD; and a clamping circuit that limits the recording current to a critical value when the recording current reaches the critical value.

The control apparatus may further comprise a multiplexer that outputs one of a first input signal inputted from the preamplifier and a second input signal inputted from the clamping circuit.

According to another aspect of the present invention, there is provided a preamplifier that applies a recording current to a coil of a magnetic head of a hard disc drive (HDD), the preamplifier comprising a clamping circuit that limits the recording current to the critical value when the recording current reaches the critical value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
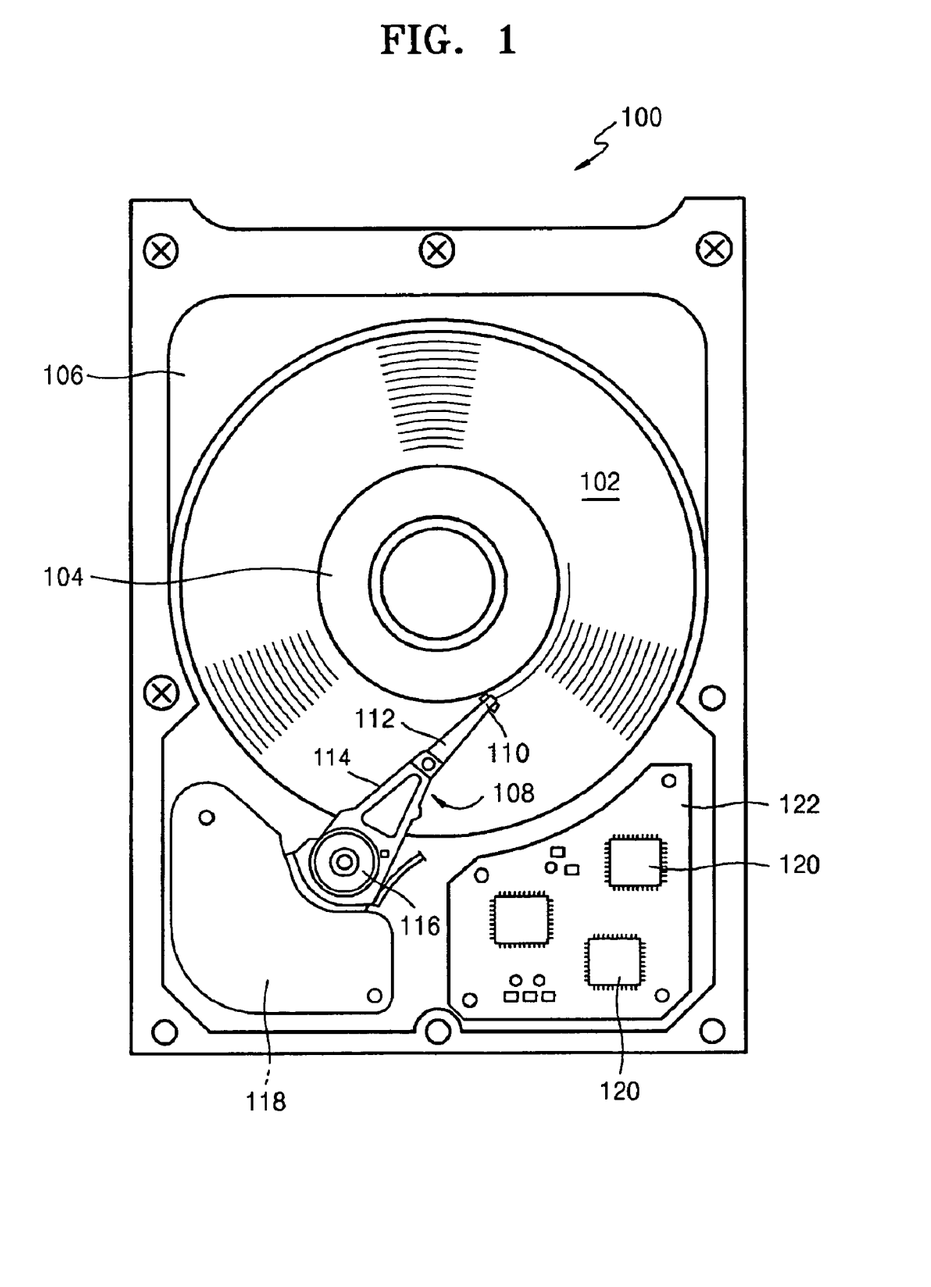
FIG. 1 is a plan view of a hard disc drive according to an embodiment of the present invention.

FIG. 1 is a plan view of a hard disc drive (HDD) 100 according to an embodiment of the present invention. The HDD 100 includes a disc 102 that is rotated by a spindle motor 104. The spindle motor 104 is mounted on a base plate 106. An actuator arm assembly 108 is also mounted on the base plate 106. The actuator arm assembly 108 includes a magnetic head 110 mounted on a suspension 112. The suspension 112 is attached to an actuator arm 114 that is rotatable on a bearing assembly 116. The actuator arm assembly 108 includes a voice coil 118 which is coupled with a magnet mounted on the base plate 106. The magnetic head 110 is moved with respect to the disc 102 by applying a current to the voice coil 118. Generally, a magnetic head 110 can be present above every disc face. The spindle motor 104, the voice coil 118, the magnetic head 110 are connected to a plurality of electronic circuits 120 mounted on a printed circuit board 122. The electronic circuits 120 include a reproduce/record channel circuit, a servo driving unit, and a spindle motor driving unit. The servo driving unit controls the voice coil 118 to control the location of the magnetic head 110. The spindle motor driving unit controls the spindle motor 104 to control the rotation of the disc 102. The reproduce/record channel circuit will be described later.

Figure 2:
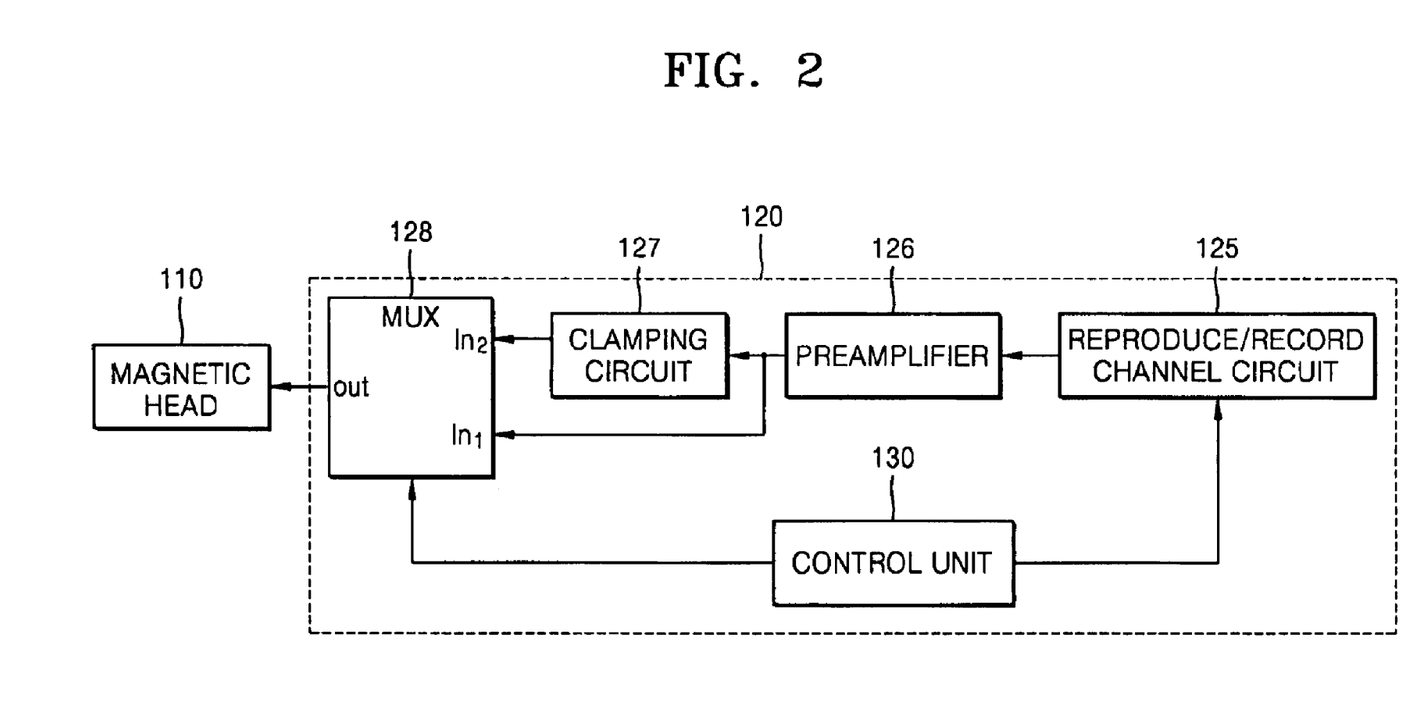
FIG. 2 is a block diagram showing a configuration of an electronic circuit according to an embodiment of the present invention.

FIG. 2 is a block diagram showing a configuration of the electronic circuits 120 according to an embodiment of the present invention. Descriptions of the servo driving unit and the spindle motor driving unit, which are well known in the art, are omitted.

Referring to FIG. 2, the electronic circuits 120 include a circuit in which a recording current is applied to a coil (not shown) of the magnetic head 110 (refer to FIG. 1). The electronic circuits 120 include a reproduce/record channel circuit 125, a preamplifier 126, a clamping circuit 127, a multiplexer 128, and a control unit 130.

The reproduce/record channel circuit 125 decodes recording information input from the control unit 130 and transmits it to the preamplifier 126.

The preamplifier 126, when recording, inputs a recording current corresponding to a recording signal input from the reproduce/record channel circuit 125 to the clamping circuit 127.

The clamping circuit 127 limits the recording current to a critical value when the recording current actually applied to the magnetic head 110 from the preamplifier 126 reaches a predetermined critical value. The critical value corresponds to a maximum recording current that is actually applied to the magnetic head 110 when recording is performed at a high frequency. The high frequency recording denotes inputting a "11" signal of binary signals, and can be referred to as a high write frequency.

The multiplexer 128 applies a first input signal $In_1$ from the preamplifier 126 or a second input signal $In_2$ from the clamping circuit 127 as an output-signal to the magnetic head 110 in response to a control signal from the control unit 130.

In order to increase tracks per inch (TPI), the structure of a magnetic head can be modified. However, in the present embodiment, a write track width (WTW) is reduced by improving a method of applying the recording current in a conventional HDD structure including the structure of HDDs produced in the future as a result of technical development.

The WTW is determined according to the magnetic head and the coercivity of the recording medium, and accordingly, the TPI can be determined. Dynamic coercivity of a HDD increases in proportion to an increase in write frequency. This denotes that recording information at a high frequency requires a magnetic field higher than when recording at a low frequency.

Figure 3:
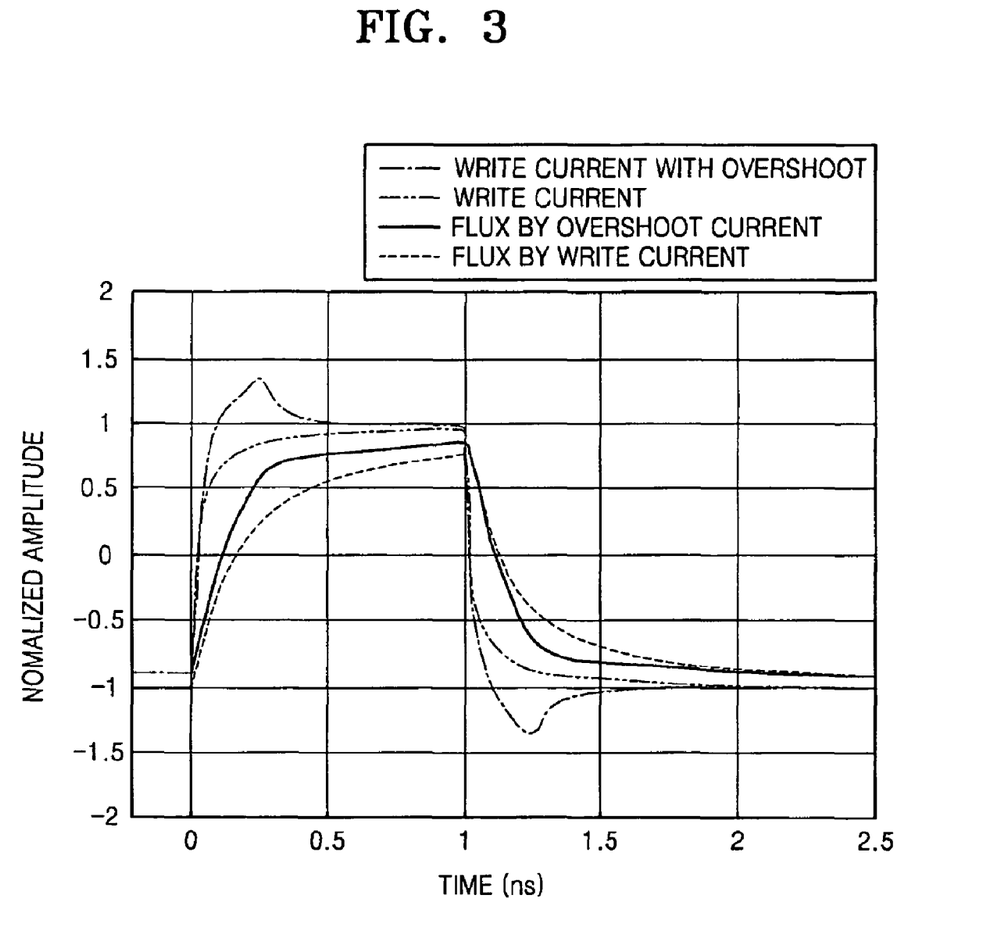
FIG. 3 is a graph showing the magnitude of recording current and flux according to time.

FIG. 3 is a graph showing the magnitude of recording current and flux according to time. Referring to FIG. 3, the recording current and flux have a predetermined rising time. After the rising time is elapsed, the recording current and the flux converge to a particular current or a flux. An overshoot current is used to reduce the rising time of the recording current or the flux. In particular, when recording at a high frequency, the overshoot current is required in consideration of a dynamic coercivity of a HDD.

Figure 4:
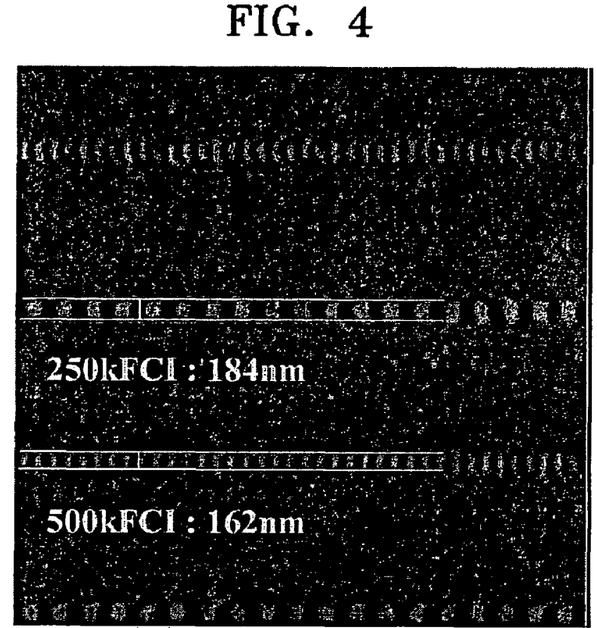
FIG. 4 is a magnetic force microscopy (MFM) image showing the shape of a recorded bit according to recording density.

FIG. 4 is a magnetic force microscopy (MFM) image showing the shape of a recorded bit according to recording density. Referring to FIG. 4, as the recording density increases, WTW reduces. That is, when recording information at a high frequency, the WTW is reduced.

Figure 5:
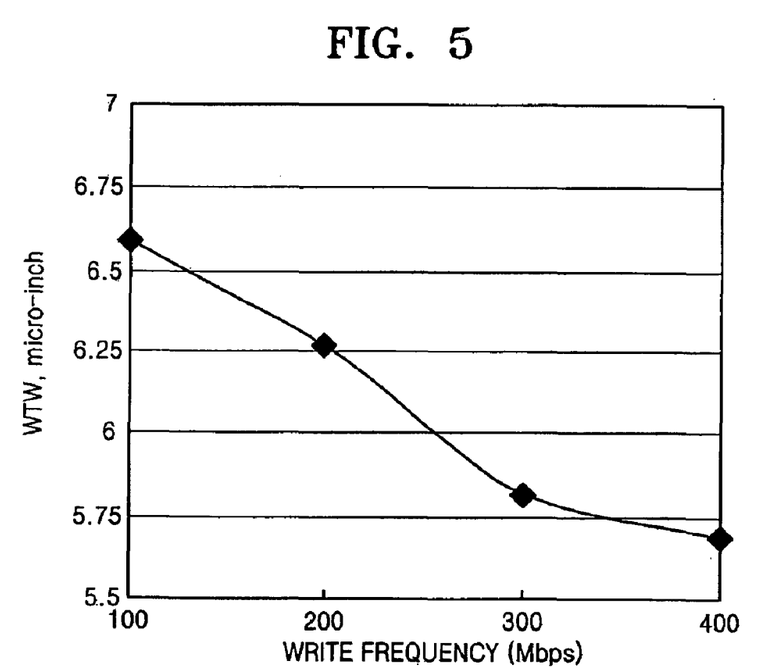
FIG. 5 is a graph showing the variation of write track width (WTW) according to write frequency.

FIG. 5 is a graph showing the variation of WTW according to write frequency. As the write frequency increases, that is, when recording density increases, WTW is reduced. When the write frequency increases from 100 Mbps to 400 Mbps, the WTW decreases by approximately 15%.

Figure 6:
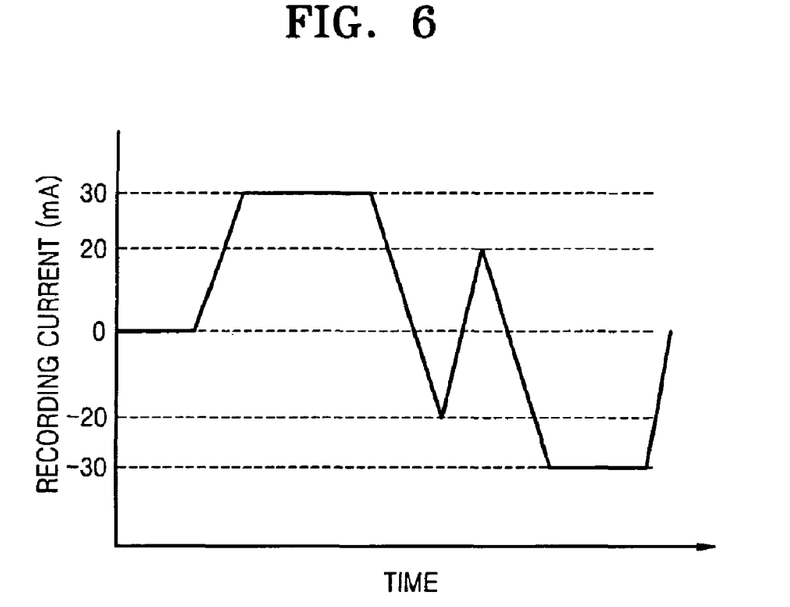
FIG. 6 is a graph showing recording currents when recording information using a conventional method.
Figure 7:
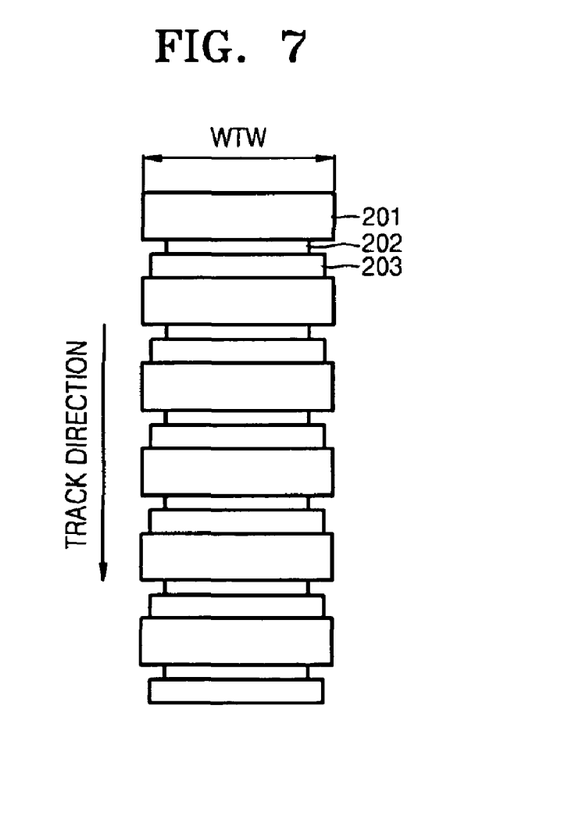
FIG. 7 is a schematic drawing showing WTWs when recording information using a conventional method.

FIG. 6 is a graph showing a recording current when recording information using a conventional method and FIG. 7 is a schematic drawing showing a WTW when recording information using a conventional method.

Referring to FIG. 6, when recording information at a low frequency, the recording current increases to a target value, for example, 30 mA, and as a result, a magnetic field in the magnetic head is increased and the dynamic coercivity of a recording medium is reduced, thereby relatively increasing the WTW as indicated by reference numeral 201 in FIG. 7. The low frequency recording occurs when more than three "0" data of binary numbers are repeated, and can also be referred to as a low recording frequency.

When recording information at a high frequency, when the absolute value of the recording current increases to a target value, for example, −30 mA, the current direction is changed so as to record next information. As a result, the recording current value when recording information is an absolute value lower than the target value, for example, −20 mA. Accordingly, a magnetic field generated from the magnetic head is small compared to the magnetic field when recording information at a low frequency and the dynamic coercivity of a recording medium is increased, thereby relatively reducing the WTW as indicated by reference numeral 202 in FIG. 7.

In FIG. 7, reference numeral 203 indicates a WTW when one or two "0" data are present between an "I" data and an adjacent "I" data. The WTW 203 has a value between a WTW when recording information at a low frequency and a WTW when recording information at a high frequency.

As such recording is repeated, as shown in FIG. 7, in the width of recorded bits, the WTW when recording information at a low frequency is different from the WTW when recording information at a high frequency. In this case, the WTW that determines the TPI becomes a wide WTW when recording information at a low frequency. An aspect of the present invention is the reduction of the WTW when recording information at a low frequency to the WTW when recording information at a high frequency.

Figure 8:
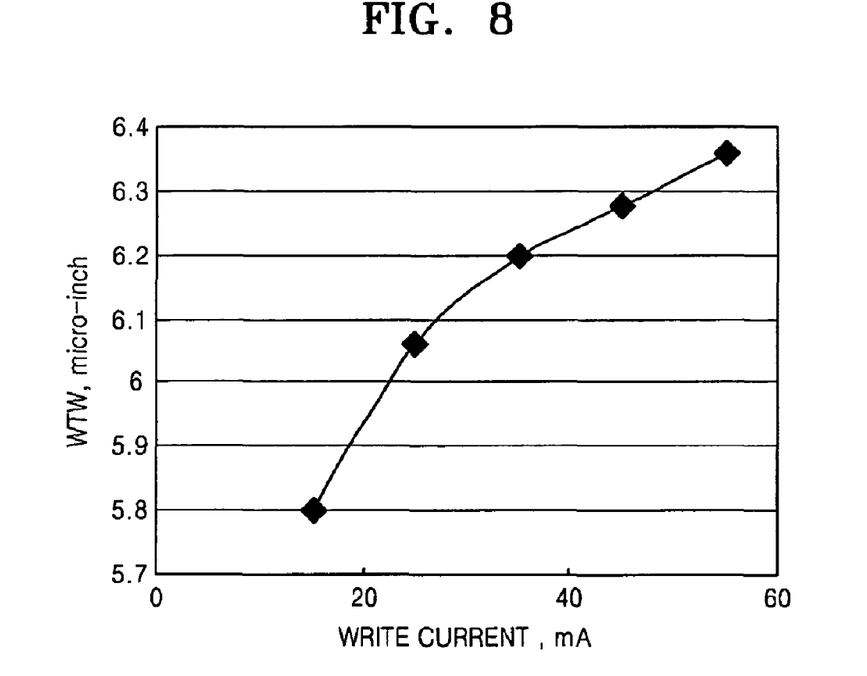
FIG. 8 is a graph showing a WTW according to a recording current at an identical frequency recording (100 Mbps)

FIG. 8 is a graph showing WTWs according to a recording current at an identical frequency recording (100 Mbps). Referring to FIG. 8, it can be seen that, even if at an identical frequency recording, as the recording current reduces, WTW is reduced. When the recording current is 20 mA, the WTW is reduced by 10 nm (approximately 0.4 micro-inches) as compared to when the recording current is 60 mA. This value of 10 nm is less than 10% of a WTW value when the WTW is 100 nm or greater. However, when the WTW is 50 nm or less as a result of gradually being reduced, the value of WTW of 10 nm accounts for 20% of the total WTW. Accordingly, WTW can be controlled by controlling the recording current.

Figure 9:
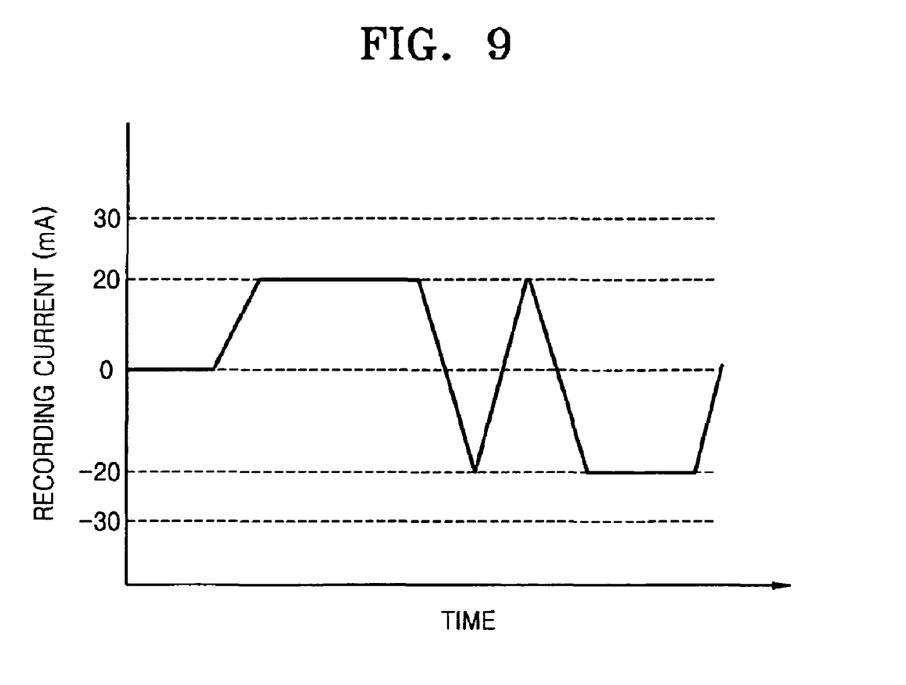
FIG. 9 is a graph showing a recording current for explaining a method of increasing recording density according to an embodiment of the present invention.

FIG. 9 is a graph showing recording currents for explaining a method of increasing recording density according to an embodiment of the present invention. When recording information at a low frequency, a recording current, that is, a target current, for example, 30 mA is applied to the magnetic head 110. At this point, the recording current that has been actually applied to the magnetic head 110 reaches a critical value, for example, a current of 20 mA, which is the current being applied at a high frequency. The current being applied to the magnetic head 110 is limited to the critical value. For this purpose, the clamping circuit 127 can be used. The use of the clamping circuit 127 can prevent the WTW when recording information at a low frequency from being greater than the WTW when recording information at a high frequency. The critical value can be determined as a current actually applied when recording information at a high frequency when applying an overshoot current to the magnetic head 110. The target current and the critical value can be obtained from characteristic tests of a head and a recording medium of each of the HDDs.

If recording information at a high frequency, while the absolute value of the recording current increases to a target value, for example, −30 mA, the current direction is changed so as to record next information. As a result, the recording current value when recording information is an absolute value, for example, 20 mA, which is lower than the target value. Accordingly, a magnetic field generated from the magnetic head 110 is similar to the magnetic field when recording information at a low frequency. Therefore, according to the present embodiment, the recording current values when recording information at a high frequency and when recording information at a low frequency can be equal. Thus, as the recording is repeated, the widths of the recorded bits of WTW when recording information at a high frequency and the WTW when recording information at a low frequency are equal, thereby increasing the TPI of HDDs.

In the method of increasing recording density according to the present invention, as described above, the setting of high recording current at the beginning is to apply an overshoot current to the magnetic head 110, and the cutting-off of the current value using the clamping circuit 127 during application of the overshoot current to the magnetic head 110 is to increase the recording density by reducing the WTW.

Figure 10:
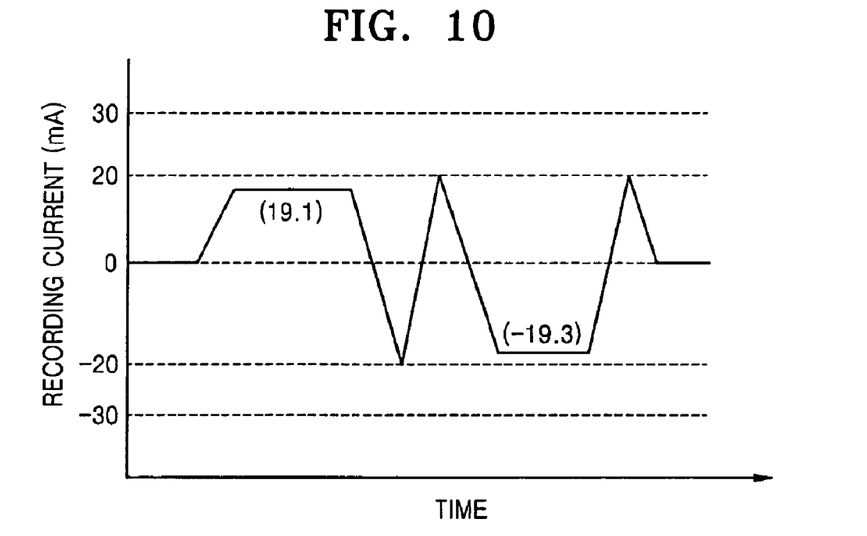
FIG. 10 is a graph showing a recording current for explaining a method of increasing recording density according to another embodiment of the present invention.
Figure 11:
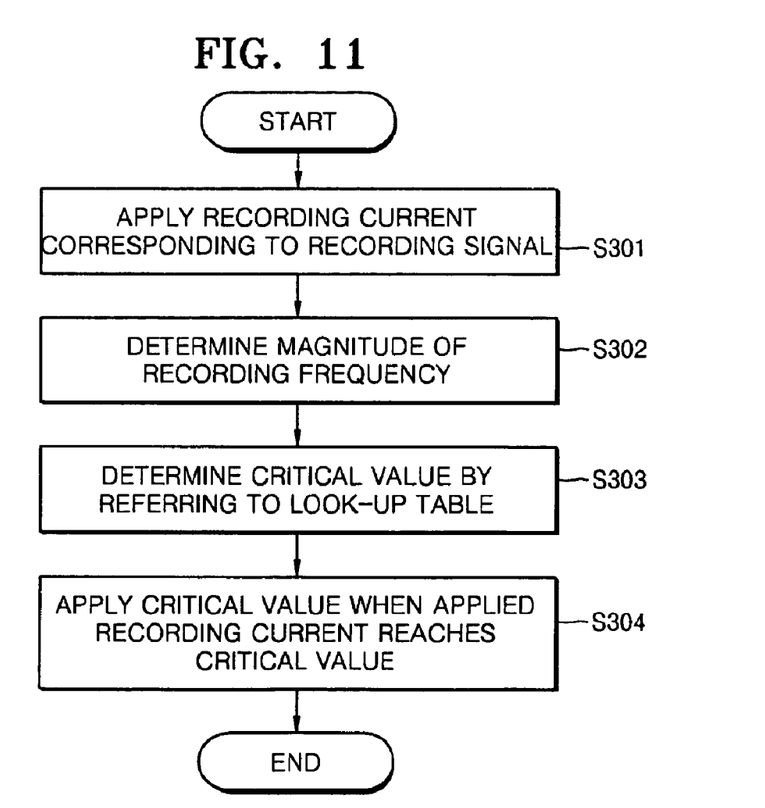
FIG. 11 is a flow chart of a method of increasing recording density according to another embodiment of the present invention.

FIG. 10 is a graph showing a recording current for explaining a method of increasing recording density according to another embodiment of the present invention. FIG. 11 is a flow chart showing a method of increasing recording density according to another embodiment of the present invention.

A recording current corresponding to a recording signal is applied to the magnetic head 110 of a HDD (S301). The recording current may be 30 mA.

The control unit 130 determines the magnitude of a recording frequency (S302). Next, a critical value is determined by referring to a look-up table of critical values according to the determined magnitude of the recording frequency (S303). Here, as for the recording frequency, data "11" can be a high recording frequency, consecutive three or four data "0" can be a low recording frequency, and one or two "0" can be an intermediate recording frequency. The magnitude of the recording frequency is determined for the following reason. When recording information using the intermediate frequency, the magnitude of a recording frequency varies according to the number of data "0", and referring to FIG. 5, the WTW may vary even if an identical recording current is applied to the magnetic head 110. Therefore, in order that the WTW remains the same when recording information at a low frequency and when recording information at a high frequency regardless of the recording frequency, an actual recording current, that is, the critical value being applied to a magnetic head 110 must be increased as the recording frequency increases.

Table 1 shows an example of a look-up table.

|  | Number of consecutive "0" | | | | |
| --- | --- | --- | --- | --- | --- |
|  | 0 | 1 | 2 | 3 | 4 |
| Critical value, mA | 20 | 19.5 | 19.3 | 19.1 | 19 |

The critical values in the look-up table shown in Table 1 are individually determined according to a magnetic head and recording medium of a corresponding HDD, and the critical values in the look-up table can be acquired during the process of testing the HDD.

In operation S302, if the magnitude of a recording frequency is determined as a high recording frequency (no consecutive data "0" data are present in Table 1, thus, when recording data "11" data), the recording current is limited in the process of changing a current signal although the recording current is not limited to the critical value. Thus, operation S303 may be omitted. Such a by-pass process can be achieved by inputting a first input signal $In_1$ by-passing the clamping circuit 127 and a second input signal $In_2$ to the multiplexer 128 and by selecting the first input signal $In_1$ inputted to the multiplexer 128 through a control signal from the control unit 130.

Referring to FIG. 10, in the case of high recording frequency an absolute value of a recording current is 20 mA, when there are three consecutive data "0", the critical value is 19.1 mA, and, when there are two consecutive data "0", the critical value is −19.3 mA.

Next, when a recording current actually applied to the magnetic head 110 reaches the critical value determined in operation S303, the current being applied to the magnetic head 110 is limited to the critical value by the clamping circuit 127 (S304).

Although the magnitude of recording currents applied to the magnetic head 110 when recording information at a low frequency and when recording information at a high frequency are different, the WTWs of both cases are identical to each other, thereby increasing the TPI of a disc. The look-up table can be obtained from characteristic tests of a magnetic head and a recording medium of a hard disc drive.

As described above, in a method of increasing recording density according to the present invention, a rising time is reduced by using an overshoot recording current and when an actual recording current reaches a critical value, the recording current is limited to the critical value. Therefore, WTW can be reduced at a low recording frequency, thereby increasing the TPI.

Also, the WTW is maintained constant regardless of the recording frequency, thereby reducing adjacent track erase (ATE) at identical TPI.

Also, the recording density can be increased without additional costs by improving a circuit in a conventional HDD.

Also, the method of increasing recording density according to the present invention can be applied not only to a perpendicular magnetic recording mechanism but also a HDD that employs the horizontal magnetic recording mechanism.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of increasing a recording density of a hard disc drive (HDD), the method comprising:
    applying a recording current corresponding to a recording signal to a magnetic head of the HDD; and
    limiting a value of a current being applied to the magnetic head to a critical value when the recording current reaches the critical value,
    wherein the critical value corresponds to a maximum recording current that is actually applied to the magnetic head when recording information at a high frequency.

2. The method of claim 1, wherein the limiting of the value of the current is performed by a clamping circuit disposed between the magnetic head and a preamplifier.

3. A method of increasing recording density of a hard disc drive (HDD), the method comprising:
    applying a recording current corresponding to a recording signal to a magnetic head of the HDD;
    determining a magnitude of a recording frequency;
    setting a critical value by referring to a look-up table comprising critical values according to the recording frequencies; and
    limiting a value of a current being applied to the magnetic head to the critical value when the recording current reaches the critical value.

4. The method of claim 3, wherein the critical values in the look-up table are individually determined according to characteristics of the magnetic head and the recording medium of individual HDD.

5. The method of claim 3, wherein a magnitude of the critical value increases according to an increase in the magnitude of the recording frequency.

6. The method of claim 5, wherein the limiting of the value of the current is performed by a clamping circuit disposed between the magnetic head and a preamplifier.

7. The method of claim 3, wherein the determining of the magnitude of the recording frequency comprises determining the number of consecutive data "0".

8. The method of claim 3, wherein, in the determining of the magnitude of the recording frequency, if the recording frequency is a high recording frequency, the setting of the critical value and the limiting of the value of the current are omitted.

9. A control apparatus of a hard disc drive (HDD) comprising:
    a preamplifier that applies a recording current corresponding to a recording signal to a coil of a magnetic head of the HDD; and
    a clamping circuit that limits the recording current to a critical value when the recording current reaches the critical value, wherein the critical value corresponds to a maximum recording current that is actually applied to the magnetic head when recording information at a high frequency.

10. The control apparatus of claim 9, further comprising a multiplexer that outputs a first input signal inputted from the preamplifier and a second input signal inputted from the clamping circuit, selects the first input signal at a recording frequency higher than a critical frequency, selects the second input signal at other recording frequencies, and outputs the selected input signal to the magnetic head.

11. A preamplifier that applies a recording current to a coil of a magnetic head of a hard disc drive (HDD), the preamplifier comprising a clamping circuit that limits the recording current to a critical value when the recording current reaches the critical value, wherein the critical value corresponds to a maximum recording current that is actually applied to the magnetic head when recording information at a high frequency.

* * * * *